United States Patent [19]

Oberer et al.

[11] 3,840,712

[45] Oct. 8, 1974

[54] METHOD AND APPARATUS FOR PLACING TEST CALLS IN A COMMUNICATION SYSTEM

[75] Inventors: Eric Oberer, Red Bank; George William Riesz, Fair Haven, both of N.J.

[73] Assignee: Bell Telephone Laboratories, Incorporated, Murray Hill, N.J.

[22] Filed: Jan. 22, 1973

[21] Appl. No.: 325,608

[52] U.S. Cl. .......................................... 179/175.2 R

[51] Int. Cl. ............................................ H04m 3/26

[58] Field of Search ...... 179/175.2 R, 175.11, 90 R, 179/90 B; 340/309.4

[56] References Cited

UNITED STATES PATENTS

| | | | |
|---|---|---|---|
| 2,697,140 | 12/1954 | Cornell et al. | 179/175.2 R |
| 3,069,512 | 12/1962 | McAllister | 179/175.2 R |
| 3,484,769 | 12/1969 | Ehner | 340/309.4 |
| 3,515,820 | 6/1970 | Bereznak | 179/175.2 R |
| 3,692,961 | 9/1972 | Le Strat et al. | 179/175.2 R |
| 3,700,830 | 10/1972 | Naylor et al. | 179/175.2 R |

*Primary Examiner*—Kathleen H. Claffy
*Assistant Examiner*—Douglas W. Olms
*Attorney, Agent, or Firm*—John J. Jordan

[57] ABSTRACT

A method and apparatus for placing test calls to emulate traffic on a group of communication paths, such as a trunk group, or on a network in a communication system. Two series of sequential test calls are placed on test lines connected to a central office to seize circuits to a distant office. The test call sequences are timed so that one series of test calls holds a communication path for a period of time which at least partially overlaps with the period of time of individual calls of the other series of test calls. In the disclosed embodiment one-number dialers are employed together with an adjustable cam timer arrangement which seizes the test lines.

9 Claims, 3 Drawing Figures

PATENTED OCT 8 1974

3,840,712

SHEET 2 OF 2

METHOD AND APPARATUS FOR PLACING TEST CALLS IN A COMMUNICATION SYSTEM

BACKGROUND OF THE INVENTION

This invention relates to a method and apparatus for accurately measuring blocking by means of test calls on a plurality of communication paths in a communication system.

A basic and useful indicator of one quality of service is the probability of call completion between a given pair of points in a communication system. The technique, often referred to as test calling, most frequently used in the past to determine this indicator involves the placing of a number of calls between the desired end points during the period of time that service is to be measured. The calls are placed either manually or automatically from a single source to a termination with automatic answering or a known response. The probability of test call blocking, $B_T$, is then simply calculated as $$B_T = N_F/N_T \quad (1)$$

where $N_T$ is the total number of test calls placed and $N_F$ is the number of test calls which fail to be completed to the desired end point for any reason.

Thus, the prior art test calling technique calls for the placing of a single source test call stream between two end points, or trunk groups, in order to simulate the customer traffic on the same trunk groups. However, in many instances the test results seriously underestimated the traffic, or call blocking, actually experienced by telephone customers. One of the obvious reasons for explaining this discrepancy is that customer generated calls occur randomly, or in a Poisson stream, while the test call stream of repetitive short-holding time calls is not random, of non-Poisson. But, even if the number of test calls originated during the test period is varied and placed at random intervals, the test results still did not accurately indicate the actual call blocking suffered by a telephone customer.

Results of single source test calling tests have indicated to us that the single source test call stream of repetitive short-holding time calls has the effect of reserving a path through the system from one test call to the next in the test call stream. For example, the typical calling routine practiced during an operator originated stream of test calls is for the operator to complete one test call, hang up, and then quickly dial the next test call. Thus the probability of a customer seizing the "used" communication path surrendered during the inter-test call time is low.

SUMMARY OF THE INVENTION

In one specific illustrative embodiment of our invention a dual generator test calling arrangement comprises a pair of one-number dialers, each connected to a communication path or test line terminating on the line side of a central office. A timing arrangement automatically establishes an off-hook condition for each line, which condition is recognized by the central office as a request for service. When dial tone is returned, a dial tone detector recognizes that the central office is in condition to receive the dialed number and activates the one-number dialer of that path.

In accordance with an aspect of our invention, the timing arrangement automatically initiates two series of sequential test calls, one on each path, and the test calls partially overlap in time.

Furthermore, in this illustrative embodiment, recording equipment is connected to both paths for automatically recording the number of calls attempted and completed during the test calling sequences. In this embodiment the test calls are placed to test terminals of a distant central office to which terminals distinctive tone generators are connected, the tone being recorded to indicate the successful completion of a test call. Overload tones, reorder tones, recorded messages, and other indicia of incompleted or blocked calls are also recorded.

It is a further aspect of our invention that optimum criteria exist for both the holding time of the test calls and the amount of overlap of the two test call trains.

BRIEF DESCRIPTION OF THE DRAWINGS

The foregoing and other objects and features of our invention will be readily understood upon a reading of the following description in conjunction with the drawing in which.

DETAILED DESCRIPTION

Figure 1:
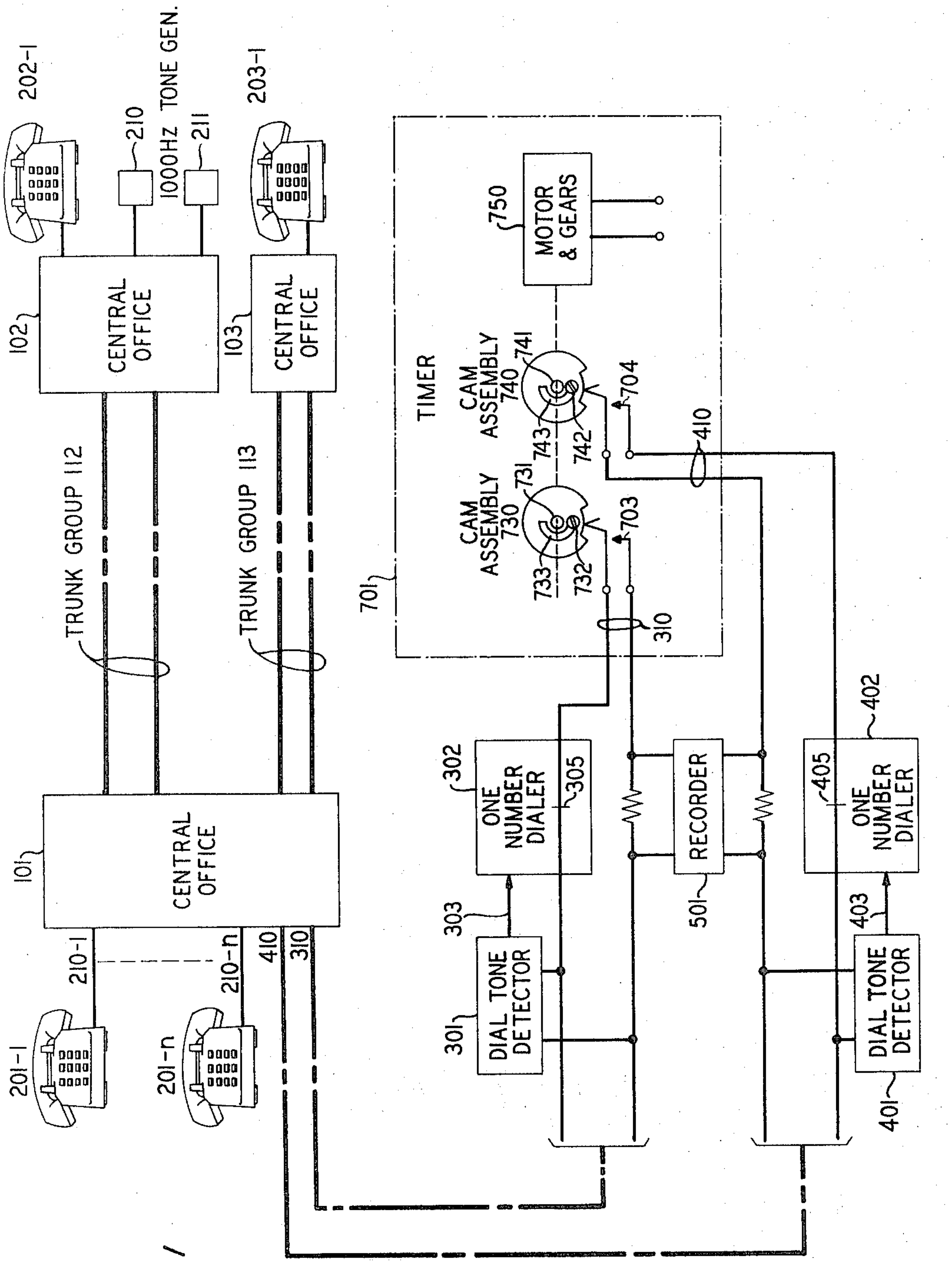
FIG. 1 shows a communication switching system including an illustrative embodiment of our invention.

FIG. 1 depicts a typical telephone switching system, well known in the art, comprising three central switching offices 101, 102 and 103. A plurality of subscribers **201-1 . . . 201-*n* are individually interconnected to their central office 101 by indicated communications paths 210-1 . . . 210-*n*. Only the first subscribers 202-1 and 203-1 are shown for office 102 and 103. Each central office contains switching equipment and control equipment, also well known in the art, for interconnecting subscribers, (e.g., 201-1, 202-1, 203-1) with other subscribers or with trunks 112, 113 which terminate in other central offices. Thus subscriber 201-1, by transmitting the proper signals, can be interconnected with subscriber 202-1 over one of the trunks of trunk group 112.**

Although FIG. 1 shows only three central offices interconnected by two trunk groups, it is realized by one skilled in the art that this telephone switching arrangement can comprise any number of switching centers, all interconnected by a plurality of trunk groups. However, for simplicity and for ease of disclosing our invention, our exemplary embodiment shows only three offices and two trunk groups and alternate routing will not be discussed.

Trunk group 112 interconnects central office 101 with central office 102 and trunk group 113 interconnects central office 101 with central office 103. Each trunk group comprises a plurality of individual trunk circuits, with the number of trunk circuits in each group depending on the amount of subscriber generated telephone traffic which a group must handle. For example, if it is anticipated that the subscribers associated with central office 101 will place more calls to subscribers associated with office 102 than to subscribers associated with office 103, then trunk group 112 will be engineered to have more trunk circuits than trunk group 113. Furthermore, if customer generated traffic between two offices becomes substantial, then more than one trunk group may be assigned to interconnect the affected offices and routing may be direct, or via tandum offices.

Since the number of trunk circuits interconnecting any two offices depends on the amount of traffic between the two offices, it is apparent that the number of trunks used varies and may not be constant for prolonged periods of time. A telephone company must be constantly aware of shifts in customer generated traffic patterns in order to have sufficient trunk circuit capacity to provide proper telephone service. Additionally, since trunk circuits comprise valuable cable which is physically run between offices and costly relay rack equipment mounted in each terminating office, it is economically expedient for the telephone company to have the proper number of trunk circuits to exactly handle interoffice traffic. Since too few trunk circuits result in poor service and the provision of too many trunk circuits is uneconomical, the telephone company constantly attempts to obtain valid data relating to customer generated traffic so as to have trunk circuits properly connected to provide the best service at the least costs.

One method, used in the prior art, to ascertain efficient use of trunk circuits is test calling. Test calling involves placing a series of telephone calls to a particular telephone number which is normally terminated in a tone generator and which is interconnected with the calling party by the group of trunks whose service is to be tested. The test calls are placed sequentially, either automatically or by an operator, during a particular test period, for instance 100 calls per hour. The number of test calls which do not result in a return tone, or in other words, the number of calls which are not completed, is considered an indication of customer experienced blocking on the trunk circuits used. As shown in equation (1) above, test call clocking $B_T$ is $$B_T = N_F/N_T$$

Thus, if $B_T$ is high, this would be an indication that more trunk circuits might be required in the test trunk group.

We can discuss the prior art test calling arrangement if we consider only that portion of FIG. 1 which comprises a dial tone detector 301 and a one number dialer 302, interconnected with central office 101 via communication path 310. FIG. 1 also shows a 1,000 Hz tone generator 210 terminated on the subscriber side of central office 102. Additionally, FIG. 1 has a timer circuit 701 which comprises switch 703 for opening and closing communication path 310.

The one number dialer 102 may advantageously be a Western Electric Company Station Dial — 53A. This automatic dialer is for use where a single telephone number is repeatedly dialed and it can be preset to dial any telephone number presently in existence in the telephone network.

Thus, for instance, if a series of test calls were to be placed to discover customer experienced blocking or simulate customer traffic on trunk group 111, the one number dialer 302 would be adjusted to call the telephone number which terminates the 1,000 Hz tone generator 210 at office 102.

The dial tone detector 301 may advantageously be a Western Electric Company dial tone detector known as the F-58124 DTD. The dial tone detector 301 detects dial tone on the communication path 310 and then provides a signal on lead 303 to activate the dialer for pulsing out or dialing the preset digits.

The timer circuit 701 may comprise a cam assembly 730, a timer motor and gear assembly 750 and a switch 703. The cam assembly can be adjusted to open and close switch 703 a specific number of times per unit time. Furthermore, the cam can be adjusted to hold the switch closed for a specific length of time during each close-open cycle. For example, the timer motor and gear assembly can be adjusted to rotate the cam assembly to close-open switch 703 100 times per hour and the cam assembly 730 can be adjusted to keep the switch closed 70 percent of the time in each close-open cycle.

In order to place a series of test calls, the timer 701 is adjusted to place the number of calls per hour which are required to provide the required data. The switch 703 opens and closes the communication path 310 and acts as a switchhook on a telephone. When switch 703 is closed, the central office 101 responds as it would for any customer requesting service. Thus, by adjusting the cams and gears as explained above, switch 703 can be opened and closed as often as desired and each time the switch is closed a new test call is initiated.

When the cam rotates and closes switch 703, central office 101 recognizes a request for service on communication path 310 and sends back dial tone in a manner already well known in the art. Dial tone detector 301 detects the dial tone and, as discussed above, signals the one number dialer 302 over conductor 303 to dial the preset digits over communication path 310 as by opening break contacts 305. The preset digits correspond to the telephone number which is assigned to the 1,000 Hz tone generator 210. Central office 101, upon receiving the digits dialed by the activated one number dialer 301, attempts to seize an idle trunk circuit of trunk group 112 so as to complete the dialed call. If a trunk circuit is seized and the call is completed, a 1,000 Hz tone signal is returned indicating a successful completion. If no tone is returned, the test call attempt was unsuccessful. The timer 701 will continue to close and open switch 703 until all the tests calls in the unit of time are attempted.

FIG. 1 also shows a recorder 501 attached to communication path 310. The recorder can be a simple recording device such as any portable cassette tape recorder. The recorder is turned on when the timing circuit initiates the first call and records the number of calls attempted and completed plus additional call related information such as the amount of dial tone delay and recorded announcements. The recorder can be turned off when the test period is ended.

Figure 2A:
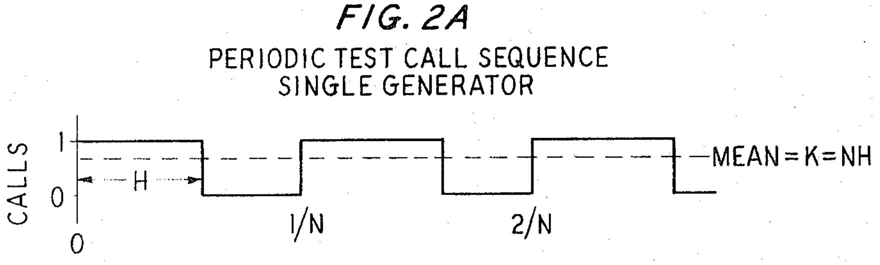
FIGS. 2*a* and 2*b* are graphical representations of illustrative test call sequences.

Thus, the prior art test call arrangement transmits a single stream of sequential test calls to one preselected number during a particular test period. FIG. 2a is a graph representing the test stream of calls and plots the number of calls vs. time. As is readily determinable from FIG. 2a, the maximum number of test calls placed at any one time is one and the minimum is zero. $H$ represents the time that each successful test call holds a seized trunk during each test call cycle and $N$ is the number of calls placed during a test period, for instance 100 calls/hour. $K = NH$ and is called the duty factor or the mean value of the number of trunks occupied by test calls. A further explanation of these parameters is given in a mathematical analysis of our invention which is presented below.

Test call results from prior art single source test calling arrangements do not give valid estimates of customer experienced blocking data and, in fact, seriously underestimate this blocking criteria as shown at Table 1 and discussed below. We have determined that one cause of this discrepancy is that a single stream of test calls in effect, reserves a path through the switching system from one call to the next. Once a test call in the sequence seizes a trunk circuit, the succeeding test calls in the sequence typically use the same trunk circuit since the probability of a customer seizing that trunk circuit during the short intercall time period is slight. Thus the test call sequence has "reserved" a path through the trunk group and the resulting test call blocking data underestimate actual customer experienced blocking.

FIG. 1 depicts an exemplary embodiment of our invention which comprises the prior art test call arrangement described above, and in addition a second dial tone detector 401 and a second one number dialer 402 interconnected with central office 101 by communication path 411; one number dialer 402 is advantageously preset with the number assigned to a 1,000 Hz generator 211 connected to office 102. The dial tone detector 401 is interconnected with the one number dialer 402 by lead 403 and the two circuits are respectively the same as the dial tone detector 301 and one number dialer 302 described above. Additionally, our exemplary embodiment comprises a second cam assembly 711 and associated switch 704 in the timer 701 assembly similar to the cam assembly 710 and switch 703 previously described. The two cams are individually mounted on the main shaft of the timer motor 750. A switch 703 or 704, actuated by each associated cam provides the switchhook function to originate and terminate test calls over each of the associated communication paths. As described above, the cams may be adjusted to provide various holding time intervals. Thus, the two cam assemblies are fixed to the main motor shaft in friction mountings 731, 741 and their relative positions may be adjusted as by setscrews 732, 742 in curved slots 733, 743 to adjust the time of the placing of each test call by the two test call dialers. Thus, by properly adjusting each cam assembly position on the motor shaft each test call of one test call series has a holding time that is partially concurrent, or overlaps, with the holding time of each test call in the second test call series. A two cam timer of this type is a Model MC3 manufactured by the Singer Company, Industrial Timer Division.

FIG. 1 also shows a two channel recorder 501 interconnected with communication paths 310 and 410. A recorder of this type is able to record both test call sequences on a single cassette and may advantageously be a J. C. Penny Company, model Penncrest No. 7,525.

In accordance with our invention, two series of test calls are placed. Timer 701 is adjusted so that cam arrangement 730 operates switch 703 to initiate and terminate calls on communication path 310 and cam arrangement 740 operates switch 704 to initiate and terminate calls on communication path 410. Dial tone detectors 301 and 401 and one number dialers 302 and 402 operate during each call cycle as previously described. The two cams are also adjusted so that the holding time of each call in one series overlaps the holding time of each call of the other series. This overlap holding time is shown graphically in FIG. 2*b*. The upper two graphs represent the holding times of each of the two series of test call and the lowest graph represents the holding times of the combined series as seen by the trunk group. *H* is the holding time of each call in each series and *S* represents the amount of time each call in the second series is offset from the corresponding call in the first series of test calls. The overlap time is $H-S$ for the two concurrent calls.

We have found that an optimum test call simulation occurs when the holding times *H* of the two series of sequential test calls are of equal duration and comprise approximately 0.36 of the test call sequence and further that the overlap time $H-S$ is approximately 0.72 of the holding time *H*.

Thus, with our invention, each call of one series is competing with another call of another series for a trunk circuit and neither series is able to reserve a path through the switching system. The test call data resulting from our invention give a true picture of actual customer experienced blocking as is shown in Table 3 and discussed below.

Although our exemplary embodiment shows two one-number dialers, two dial tone detectors and an electromechanical timer, it can be readily understood that many other arrangements can be used while still remaining within the scope of our invention. For example, our novel method may be practiced by two operators or by different automatic arrangements; further, an electric timing arrangement can be substituted for the cam-gear arrangement described above.

MATHEMATICAL DISCUSSION

Results from a point-to-point blocking study conducted in 1971 in a large United States metropolitan area give an indication of a discrepancy between test call blocking and actual customer experienced blocking between test points. In the study simultaneous test calls and traffic measurements were made over a multiplicity of routes in an effort to determine the usability of component measurements to ascertain the point-to-point blocking experienced by customers. The test calls were placed manually by operators with instructions to place as many calls as possible during the one hour test period to a given test termination. The results indicate that large discrepancies apparently exist between test call blocking and calculated customer blocking as exemplified by the data of Table 1.

TABLE 1

FIELD STUDY RESULTS

| | TRAFFIC MEASUREMENTS | | | TEST CALLS | |
|---|---|---|---|---|---|
| | Attempted Calls | Not Completed | Percent Blocking | Calls | Percent Blocking |
| 1) | 151 | 13 | 8.5 | 73 | 0 |
| 2) | 200 | 17 | 8.5 | 100 | 3 |
| 3) | 146 | 19 | 13.0 | 100 | 0 |

It is difficult to ascribe these discrepancies to measurement inaccuracies. In all cases the routing is of the simplest variety (a single direct trunk group with no alternate route); the register readings are reasonable and self-consistent and the few test call failures would appear to rule out misinterpretations of the test call dispositions.

To ascertain whether the discrepancies might be explicable by the nature of the test call stream, a simulation was constructed. Although due to the manual nature of the test calling in the experiment the exact nature of the test call stream is not known, a reasonable facsimile may be constructed. The placement of about 100 calls during the hour results in an average rate of one call every 36 seconds. Since the test calls required seven digit rotary dialing, 10 seconds was assumed to represent the sum of dialing time plus post-dialing time to trunk seizure; the remaining 26 seconds was the assumed nominal trunk holding time (0.72 erlangs). Sensitivity to the holding time assumption was examined by additionally calculating blocking for 16 and 31 second test call holding times. The results are listed in Table 2 where the percent of calls blocked is given for various size trunk groups, both as observed and as simulated by test calls.

TABLE 2

PERCENT BLOCKING

| TRUNKS | CUSTOMER CALLS | TEST CALLS 16 s. | 26 s. | 31 s. |
|---|---|---|---|---|
| 9 | 14.7 | 8.0 | 5.2 | 3.1 |
| 10 | 9.6 | 5.0 | 3.2 | 1.9 |
| 11 | 5.9 | 3.0 | 1.9 | 1.1 |
| 12 | 3.4 | 1.6 | 1.0 | 0.6 |
| 13 | 1.8 | 0.9 | 0.5 | 0.6 |

It is quite obvious that for the situations shown, the test call blocking seriously underestimates the actual customer blocking. Shorter test call holding times are seen to reduce the percent blocking error although it is still large for realistic values. Clearly the error is zero for the null holding time case as a periodic sample of a Poisson process duplicates the call congestion.

Our review of the test results using a single test call source indicated that the stream of repetitive short holding time test calls seems to reserve a path through the system from one test call to the next test call. The probability that a customer will seize the path during the time interval between test calls is low and, therefore, the test calls repeatedly use the same "reserved" path. Thus the blocking encountered by the test calls is lower than the actual customer experienced blocking, since the test calls encounter little or no competition for a communication path.

Since it is known that the peakedness (variance to mean ratio of offered load) of competing parcels of traffic is a determinant of the blocking encountered by each parcel, we examined the test calling problem from this point of view. The significant parameter in the analysis is the fraction of time a successful test call holds a trunk during the interval between successive test call attempts. Denoting this parameter, the duty factor, as $K$, it is related for a uniform test calling rate $N$ and fixed test call holding time $H$ in unit of time as $$K = NH, \text{ where } 0 < K < 1. \quad (2)$$

Again referring to FIG. 2*a* which graphically represents a single source test call stream vs. time, the peakedness of such a test call stream may be calculated as follows. The duty factor $K$ is the fraction of time that the periodic sequence of test calls, if all successful, would occupy a trunk. Thus, the offered load ($\rho$) in erlangs is simply:

$$\rho = K. \quad (3)$$

The variance of the offered load ($\sigma_\rho^2$) is calculated as $$\sigma_\rho^2 = K(1-K)^2 + (1-K)(0-K)^2 = K(1-K). \quad (4)$$

Hence, the variance to mean ratio or peakedness ($Z$) for the sequence is $$Z = \sigma_\rho^2/\rho = 1-K. \quad (5)$$

Therefore the peakedness of the single source regular test calling stream is always less than the unity peakedness of the assumed Poisson customer calling stream. In fact, in practice it is frequently much less than unity. Since the minimum test call holding time is determined by the time required to recognize success or failure of the test attempt, where sufficient time must always be provided to detect a potential "high and dry," $K$ may approach unity at high test calling rates. This results in a test call stream with a peakedness approaching zero. Such a "smooth" stream of traffic can be expected to see a lower blocking over a given route when applied in conjunction with "more peaked" Poisson traffic.

Clearly, then, an approach to eliminate the percent blocking error would be to provide a test calling scheme which achieved a peakedness of one, that of Poisson customers. For the previously described test call sequence, a $Z$ of 1 can be approached by reducing the duty factor $K$. However, as the holding time must be greater than zero, the duty factor can only be reduced by decreasing the test calling rate. However, a decreased test calling rate often results in insufficient data for accurately determining customer blocking.

It is an aspect of our invention to use multiple random test call sources to produce a test call process analogous to the customer process. A peakedness calculation may be made for the case of the two random test call generators such as those associated with communication paths 310 and 410 in FIG. 1, by defining a duty factor for a random generator. A random generator is herein defined to randomly initiate calls with finite holding time followed by nonzero but finite wait times such that the average duty factor is $K$. When two such random generators place calls independently, then the number of test calls in progress at any time will vary between zero and two depending on the relative status of the generators at a given instant in time.

If each generator has an average duty factor $K$ (which is also the probability of an offered call) then the probability of two calls becomes $K^2$, the probability of one is $2K(1-K)$ and probability of none is $(1-K^2)$. From this, the average offered load is calculated $$\rho = 2(K^2) + 2K(1-K) = 2K, \quad (6)$$

and the variance of the load is:

$$\sigma_\rho^2 = K^2(2K-2)^2 + 2K(1-K)(2K-1)^2 + (1-K)^2(2K)^2\sigma_\rho^2 \quad (7)$$

$$\sigma_\rho^2 = 2K(1-K). \quad (8)$$

The variance to mean ratio in peakedness is:

$$Z = \sigma_\rho^2/\rho = 1 - K. \quad (9)$$

Similarly it can be shown that $Z = 1 - K$ for any finite number of random test call sources. Since for each source $K = NH$ where $N$ is the test call rate per source, the total test call rate is then simply $N_T = MN$ where $M$ is the number of call sources. Thus $$Z = 1 - HN_T/M. \quad (10)$$

So it is seen that the peakedness will approach but not equal unity for increasingly large finite numbers of random generators. Unfortunately in practice a real improvement in matching the customer blocking is achieved only with the employment of many such random generators. But the example provides the insight that the introduction of multiple sources into the traffic stream produces a more peaked call stream thereby changing the traffic characteristics which we are attempting to study and further making traffic measurements unreliable.

Exploiting the fact that overlapping holding periods will increase the peakedness of a call stream suggests synchronizing streams of calls from separate generators. Consider the simplest case first, that of two generators operated synchronously, in phase, with identical holding times.

Here, the average offered load $\rho$ is $2K$, the variance is $4K(1-K)$ and so $Z$ is $2(1-K)$. Thus, for $K = 0.5$, $Z = 1$. So it is seen that a peakedness of one is achievable with two synchronized test call sources. In fact, a $0 < Z < 2$ is obtainable as a function of the holding time fraction.

Figure 2B:
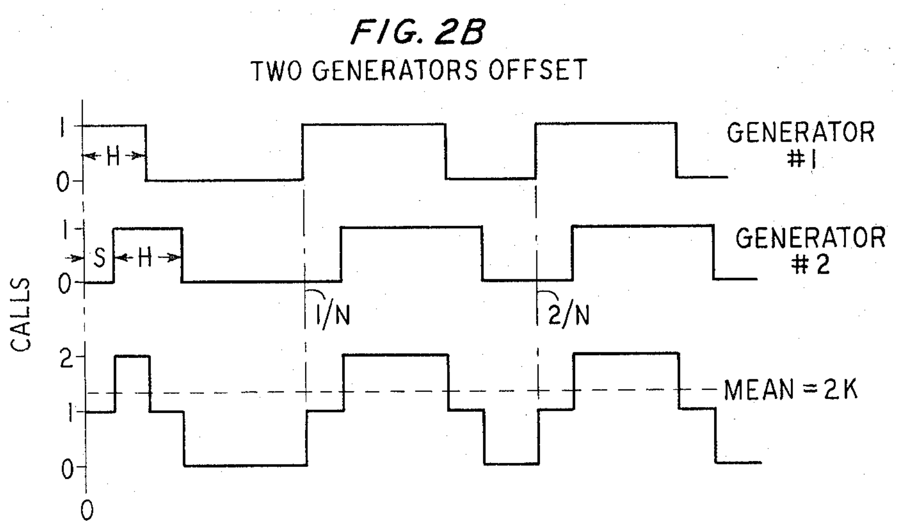

In accordance with our invention, an additional degree of freedom is introduced by allowing for a phasing, or overlap, difference between the two streams (see FIG. 2*b*). If $L$ is defined as the fractional cycle offset of the second generator with respect to the first such that $$L = NS \text{ where } 0 \leq L \leq K \quad (11)$$

and $$L = K \leq 1 \quad (12)$$

given $S$ as the offset time, then as previously $$\rho = 2K. \quad (13)$$

However, as seen in FIG. 2*b*, the total offered load now varies in a stepwise manner between zero and two calls. Now $$\sigma_\rho^2 = 4K(1-K) - 2L \quad (14)$$

and $$Z = 2(1-K) - L/K. \quad (15)$$

For $L = 0$ this reduces to the earlier case of synchronous, in phase generators. To obtain $Z = 1$, the relationship between $L$ and $K$ is $$L = K(1-2K). \quad (16)$$

Thus for a given holding time fraction (so long as $K \leq 0.5$), a value of $L$ exists which will provide a test call stream peakedness of unity.

This analysis can be extended to the case of an arbitrary number of generators. Considering $M$ test call generators identically offset by the fraction $L$, and with equal duty factors $K$ results in peakedness $$Z = M(1-K) - L(M^2 - 1)/3K. \quad (17)$$

For producing a test call stream with a peakedness of one there appears to be no advantage to using more than two generators. The potential advantages of additional generators is an ability to match higher order moments of the customer stream or to obtain higher peakedness factor test call streams (two generators are limited to a $Z \leq 2$). The latter could be of importance in overflow traffic studies or in cases where offered loads were known not to be Poisson.

In order to gain additional insight, we attempted to exactly formulate the test call and customer call blocking for the case of a lost-calls-cleared trunk group. Using a computer, solutions to derived equations were obtained for a wide variety of offered loads, trunk group sizes, and test call timing parameters. From these data, it was found that the results were indeed largely insensitive to changes in $K$ and $L$. This appears due to the fact that the most important property of the dual-source test call stream is the effective removal of one trunk from the system seen by the delayed test call when the two sources have overlapping holding times. However, from the analysis data it is possible to contruct a "best" call sequence which achieves the closest Poisson call blocking match over the range of trunk group sizes and loads considered.

An offset time equal to the holding time of value one-third the duty cycle $K$ provided the best blocking match for loads from 4 to 48 erlangs and groups of 10 to 40 trunks. These results along with calculations for a single source and a dual source with $Z = 1$ ($S = 0.08$ $K = 0.4$) are shown in Table 3. In all cases the total test call rate is 100/hour.

TABLE 3

TEST CALL BLOCKING ANALYSIS

| CUST. TNKS. | LOAD (ERL) | BLOCKING (%) Single Generator H=26sec CUST. | T.CALL | Dual Generator Z = 1 CUST. | T.CALL | H=S=24sec CUST. | T.CALL |
|---|---|---|---|---|---|---|---|
| 10 | 4.0 | 1.09 | 0.24 | 1.50 | 0.86 | 0.89 | 0.94 |
| 10 | 6.67 | 9.22 | 3.25 | 10.1 | 8.2 | 8.3 | 8.6 |
| 10 | 10.0 | 25.0 | 12.1 | 25.4 | 24.5 | 23.7 | 24.2 |
| 20 | 12.0 | 1.4 | 0.6 | 1.64 | 1.32 | 1.31 | 1.31 |
| 20 | 16.0 | 7.8 | 4.0 | 8.2 | 7.7 | 7.5 | 7.5 |
| 20 | 22.0 | 22.7 | 14.3 | 22.9 | 23.6 | 22.2 | 22.2 |
| 40 | 30.0 | 1.77 | 1.03 | 1.90 | 1.77 | 1.71 | 1.68 |
| 40 | 38.0 | 9.8 | 6.6 | 10.1 | 10.2 | 9.7 | 9.6 |
| 40 | 48.0 | 23.4 | 17.9 | 23.5 | 24.8 | 23.2 | 23.0 |

We claim:

1. A method of emulating subscriber generated random traffic on a group of communication paths in a communication system comprising:

placing a first series of sequential calls wherein each completed call of the sequence is timed to hold one of said group of communication paths for a first period of time; and placing a second series of sequential calls wherein each of the completed calls of the second series is timed to hold another one of said group of communication paths for a period of time that is at least partially concurrent with said first period of time whereby each call of the first series of calls competes with each call of the second series of calls for communication paths in the communication system.

2. A method of placing test calls on a group of communication paths interconnecting a plurality of end points in a communication system for accurately measuring the blocking experienced by actual customer traffic on said group of communication paths comprising:

placing a first series of sequential test calls between a first pair of end points with each completed test call holding one of said group of communication paths for a first period of time; and placing a second series of sequential test calls between a second pair of end points with each completed test call of said second sequence holding one of said group of communication paths for a second period of time that partially overlaps said first period of time.

3. A method of placing test calls as recited in claim 2 wherein said first and second periods of time are approximately of equal duration and comprise approximately 0.36 of each test call time sequence; and said second period of time overlaps said first period of time during approximately 0.72 of the first period of time.

4. A method of placing test calls according to claim 2 further comprising:

recording the number of test calls attempted during said first and second series of sequential test calls; and recording the number of test calls completed during said first and second series of sequential test calls.

5. Apparatus for placing test calls to emulate traffic on a group of communication paths comprising:

timing means for generating first and second series of timing signals wherein each signal in said first series is time related to a respective signal in said second series;

first call placing means interconnected with said group of communication paths responsive to said first sequence of timing signals for placing a first series of sequential calls on said communication paths; and second call placing means interconnected with said group of communication paths and responsive to said second sequence of timing signals for placing a second series of sequential calls on said communication paths whereby the period of time which said second call placing means holds a communication path during each call is at least partially concurrent with the period of time which said first call placing means holds another communication path during each call.

6. Apparatus according to claim 5 wherein said first and second call placing means comprise single number dialers.

7. Apparatus according to claim 5 further comprising:

first and second dial tone detectors interconnected between said first and second call placing means and said group of communication paths respectively and means responsive to said detectors for enabling said call placing means.

8. Apparatus according to claim 7 further comprising:

recording means interconnected with said first and second call placing means for recording the number of calls attempted and completed during each series of sequential calls.

9. Apparatus for placing test calls comprising:

rotating timing means;

first and second subscriber lines connected to a switching office;

first and second switching means connected in series with said first and second subscriber lines, respectively;

first dialing means interconnected with said first subscriber line;

second dialing means interconnected with said second subscriber line;

first dial tone detecting means interconnected with said first subscriber line and said first dialing means for activating said first dialing means when dial tone is detected on said first subscriber line;

second dial tone detecting means interconnected with said second subscriber line and said second dialing means for activating said second dialing means when dial tone is detected on said second subscriber line;

first cam assembly means for closing and opening said first switching means as said cam assembly rotates, said first cam assembly means having adjustable cams for holding said first switching means closed for a definite amount of time during each close-open switch cycle;

second cam assembly means for closing and opening said second switching means as said cam assembly rotates, said second cam assembly having adjustable cams for holding said second cam assembly having adjustable cams for holding said second switching means closed for a definite amount of time during each close-open switch cycle; and adjustable rotating means for connecting said first and second cam assembly means to said rotating timing means for rotating each cam assembly means at different phases so that said first switching means will be closed during a period of time that partially overlaps the period of time said second switching means is closed.

* * * * *